M. B. Markham,
Gate Latch.
No. 82,537. Patented Sep. 29, 1868.
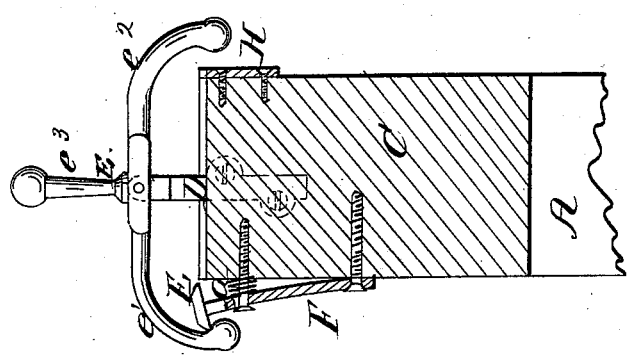
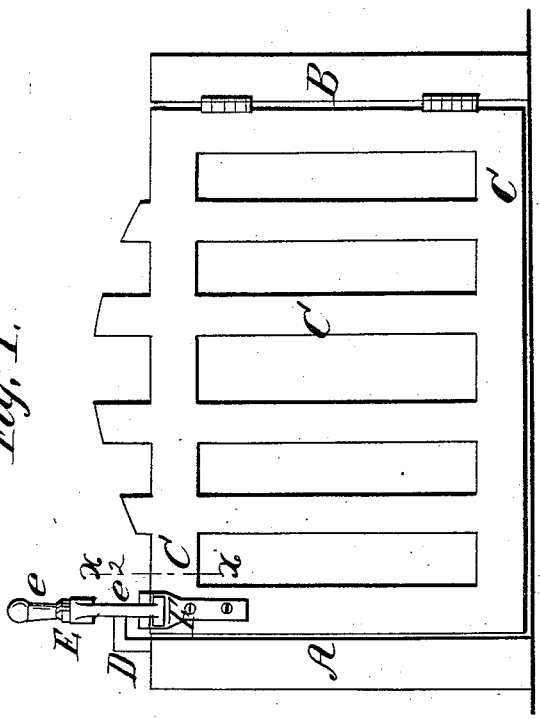
Witnesses:
W. C. Ashketter
Wm. A. Worgan
Inventor,
M. B. Markham
per Munn & Co
Attorneys

United States Patent Office.

M. B. MARKHAM, OF GRASS LAKE, MICHIGAN.

Letters Patent No. 82,537, dated September 29, 1868.

---

IMPROVEMENT IN GATE-FASTENINGS.

---

The Schedule referred to in these Letters Patent and making part of the same.

---

TO ALL WHOM IT MAY CONCERN:

Be it known that I, M. B. MARKHAM, of Grass Lake, in the county of Jackson, and State of Michigan, have invented a new and improved Gate-Fastening; and I do hereby declare that the following is a full, clear, and exact description thereof, which will enable others skilled in the art to make and use the same, reference being had to the accompanying drawings, forming part of this specification.

Figure 1 is a side view of a gate to which my improved fastening has been attached.

Figure 2 is a detail sectional view of the same, taken through the line $x\ x$, fig. 1.

Similar letters of reference indicate corresponding parts.

My invention has for its object to furnish an improved gate-fastening, which shall be so constructed and arranged that when the gate is swung shut it will fasten itself, and which shall at the same time be cheap, simple in construction, and reliable in operation, holding the gate securely fastened; and it consists in the pivoted three-armed bar, pivoting-bar or arm, and spring-catch, in combination with each other, as hereinafter more fully described.

A is the front post, B is the rear or hinge-post, and C is the gate, about the construction of which parts there is nothing new.

D is an arm, the lower part of which is screwed or bolted fast to the upper part of the inner side of the front post A. The upper part of the arm or bar D is bent inward at right angles, and to its end is pivoted the three-armed bar E, in such a position that its side-arms $e^1$ and $e^2$ may be curved downward upon each side of the gate, as shown in fig. 2. The ends of the arms $e^1$ and $e^2$ have knobs formed upon them, to give them the necessary weight, the knob upon the arm $e^2$ being the heavier, so that when the gate is open, the said three-armed bar may take of itself the proper position to receive and fasten the gate when swung shut. The arm $e^1$ is bent downward a little more than the arm $e^2$, so as to bring its knob into a more favorable position to be caught and held by the spring-catch F.

The third arm, $e^3$, of the three-armed bar E, projects upward, to serve as a handle in unfastening the gate. The spring-catch F is secured to the gate C by two screws or bolts, as shown in figs. 1 and 2, and its upper end is held outward by the spring G, coiled around the upper one of said screws or bolts, as shown in fig. 2. H is a plate, attached to the other side of the gate, to strike against the knob of the arm $e^2$, to prevent the gate from being worn or injured by striking against said knob.

I claim as new, and desire to secure by Letters Patent—

An improved gate-fastening, formed by the combination of the pivoting-arm or bar D, the three-armed bar E, and the spring-catch F, with each other, said parts being constructed and operating substantially as herein shown and described, and for the purpose set forth.

M. B. MARKHAM.

Witnesses:
L. B. DANFORTH,
J. C. DAVIS.